(12) United States Patent
Roe et al.

(10) Patent No.: US 12,342,019 B2
(45) Date of Patent: *Jun. 24, 2025

(54) SYSTEMS AND METHODS FOR IMPLEMENTING PRIMARY/SECONDARY CONFIGURATION DATA TO REDUCE AN AMOUNT OF CONFIGURATION DATA THAT NEEDS TO BE CENTRALLY STORED FOR LARGE-SCALE DISTRIBUTION

(71) Applicant: Adeia Guides, Inc., San Jose, CA (US)

(72) Inventors: Glen E. Roe, Simi Valley, CA (US); Randon Purcell, Sandy, UT (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,128

(22) Filed: Nov. 8, 2023

(65) Prior Publication Data

US 2024/0080507 A1 Mar. 7, 2024

Related U.S. Application Data

(63) Continuation of application No. 18/070,891, filed on Nov. 29, 2022, now Pat. No. 11,871,059, which is a
(Continued)

(51) Int. Cl.
*H04N 21/258* (2011.01)
*H04N 21/239* (2011.01)
(Continued)

(52) U.S. Cl.
CPC ... *H04N 21/25841* (2013.01); *H04N 21/2393* (2013.01); *H04N 21/26291* (2013.01); *H04N 21/4435* (2013.01)

(58) Field of Classification Search
None
See application file for complete search history.

(56) References Cited

U.S. PATENT DOCUMENTS 6,239,794 B1 5/2001 Yuen et al.
6,564,378 B1 5/2003 Satterfield et al.
(Continued)

OTHER PUBLICATIONS

International Search Report and Written Opinion of PCT/2018/030643 dated Jan. 24, 2019.

*Primary Examiner* — Omar S Parra
(74) *Attorney, Agent, or Firm* — Haley Guiliano LLP

(57) ABSTRACT

Systems and methods are disclosed herein for storing configuration data as a set of master data and override data where one set of configuration data is defined as the master and every other set of configuration data is defined as override configuration data. A media guidance application may generate master configuration data including the most common configuration data used in the geographical region served by the media guidance application, and number of override configurations which contain only those data which differ from the master configuration data for a number of sub-regions of the geographical region. This reduces duplicative configuration data, and the media guidance application need only store one full set of configuration data, namely the master configuration data, and a number of smaller override configurations.

18 Claims, 10 Drawing Sheets

Related U.S. Application Data continuation of application No. 17/040,463, filed as application No. PCT/US2018/030643 on May 2, 2018, now Pat. No. 11,539,996.

(60) Provisional application No. 62/650,224, filed on Mar. 29, 2018.

(51) Int. Cl.
 *H04N 21/262* (2011.01)
 *H04N 21/443* (2011.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 9,674,578 B2 | 6/2017 | Kim et al. |
| 10,827,210 B1 * | 11/2020 | Almeida ............ H04N 21/6118 |
| 11,539,996 B2 | 12/2022 | Roe et al. |
| 2002/0174430 A1 | 11/2002 | Ellis et al. |
| 2005/0251827 A1 | 11/2005 | Ellis et al. |
| 2010/0138869 A1 * | 6/2010 | Li ........................ H04H 60/51 725/54 |
| 2010/0153885 A1 | 6/2010 | Yates |
| 2017/0359216 A1 | 12/2017 | Naiden et al. |
| 2017/0366854 A1 * | 12/2017 | Puntambekar ..... H04N 21/4788 |
| 2023/0104351 A1 | 4/2023 | Roe et al. |

* cited by examiner

| Channel Number | Service ID | |
|---|---|---|
| 101 | 56 | Add Override |
| 102 | 99 | Add Override |
| 103 | 22 | Add Override |
| 104 | 84 | Add Override |
| 105 | 53 | Add Override |
| 106 | 47 | Add Override |
| 107 | 12 | Sub-region 1<br>Sub-region 2<br>Sub-region 3<br>Sub-region 4 |

FIG. 3

SYSTEMS AND METHODS FOR IMPLEMENTING PRIMARY/SECONDARY CONFIGURATION DATA TO REDUCE AN AMOUNT OF CONFIGURATION DATA THAT NEEDS TO BE CENTRALLY STORED FOR LARGE-SCALE DISTRIBUTION

CROSS-REFERENCE TO RELATED APPLICATIONS

This application is a continuation of U.S. patent application Ser. No. 18/070,891, filed Nov. 29, 2022, which is a continuation of U.S. patent application Ser. No. 17/040,463, filed Sep. 22, 2020, now U.S. Pat. No. 11,539,996, which is a national stage application under 35 U.S.C. § 371 of International Application PCT/US2018/030643, filed May 2, 2018, which claims the benefit of U.S. Provisional Patent Application No. 62/650,224, filed Mar. 29, 2018, the disclosures of which are hereby incorporated by reference herein in their entireties.

BACKGROUND

When a geographic region served by a headend has multiple sub-regions, whose content supplied by the headend may vary, each sub-region requires different configuration data to be served to user equipment in each respective sub-region. To address this issue, in related art systems, each set of configuration data is stored on a server and delivered to each user equipment in its entirety, even when configurations for different sub-regions are identical or nearly identical. Each set of configuration data must be configured individually in the related art systems, and if all sets of configuration data require a same change, that change must be made multiple times, once for each set of configuration data. This results in bloated storage on the server as well as bloated storage and unnecessary bandwidth usage on data carousels serving the geographic region.

SUMMARY

Accordingly, to overcome the problems created by related art systems, systems and methods are disclosed herein for storing configuration data as a set of master data and override data where one set of configuration data is defined as the master and every other set of configuration data is defined as override configuration data. Specifically, a media guidance application may generate master configuration data including the most common configuration data used in the geographical region served by the media guidance application, and a number of override configurations which contain only those data which differ from the master configuration data. For the master configuration data, the information may be stored in a specific database table. For example, the configuration data may be a channel lineup. The channel lineup information may be stored in a specific database table for each and every channel in the lineup. Similarly, each override lineup may include information about a channel or set of channels in a specific database table, separate from the master lineup data. Accordingly, duplicative configuration data is greatly reduced, and the media guidance application need store only one full set of configuration data, namely the master configuration data, and a number of smaller override configurations.

For example, a media guidance application may receive, generate, or otherwise access (e.g., using control circuitry of a media device) master configuration data for the geographical region. The media guidance application may then identify, based on user input, a subset of the configuration data that should be different for a particular sub-region, and generate override data for that sub-region containing only the configuration data that is different from the identified subset of master configuration data. The media guidance application may then store both the master configuration data and the override data on a server for access by user equipment. Upon receiving the master configuration data, user equipment may request and/or retrieve the override data for the sub-region in which the user equipment is located. The user equipment may generate configuration data specific to the sub-region by overwriting portions of the master configuration data with corresponding portions of the override data.

As an example, a media system may serve a geographical region comprising several sub-regions. All sub-regions within the geographical region may receive several media streams. Some of the media streams may be identical, and some may differ. For example, user equipment of a first sub-region may receive five media streams, each comprising ten programs. User equipment in a second sub-region may also receive five media streams, three of which may be identical to those received by user equipment in the first sub-region, and two may be different. Master configuration data, which may be, for example, a channel lineup and associated mapping data that is most common across all sub-regions, may be stored on a server, along with regional variant data which includes any changes from the master configuration data that are required to correct the data for a particular sub-region. The master configuration data may be sent to all user equipment in the geographical region. User equipment in each sub-region may request the regional variant data for their respective sub-region, and overwrite portions of the master configuration data with the corresponding portions of the regional variant data.

In some aspects, to generate user equipment configuration data specific to a sub-region of a geographical region, a media guidance application may be configured to transmit master configuration data to first user equipment and to second user equipment of the geographical region. For example, a headend or data carousel may transmit a master channel lineup to user equipment (e.g., set-top boxes) in a geographical region served by the headend or data carousel. The media guidance application may be configured to receive a first request from first user equipment for first variant data specific to a sub-region of the geographical region in which the first user equipment is used, and a second request from second user equipment for second variant data specific to a second sub-region of the geographical region in which the second user equipment is used. For example, while the first and second user equipment may be in the same geographical region, each may be located in a different sub-region. Each sub-region may have a different channel lineup or, as in the example above, channels may be delivered on different streams, requiring slight modification of the master channel lineup and associated mapping data. User equipment may therefore request regional variant or override data representing the differences between the master channel lineup and the channel lineup of the appropriate sub-region.

In response to receiving the first request, the media guidance application may be configured to determine whether the first regional variant data is available. For example, the media guidance application may query a database or other data structure for the presence of regional variant data for the sub-region from which the first request was received. In response to determining that the first regional variant data is available, the media guidance application may transmit the first regional variant data to the first user equipment, wherein the first user equipment generates first configuration data specific to the first sub-region by modifying a first portion of the master configuration data based on the first variant data.

Similarly, in response to receiving the second request, the media guidance application may be configured to determine if the second regional variant data is available, and to transmit the second regional variant data to the second user equipment, wherein the second user equipment similarly generates second configuration data specific to the second sub-region by modifying a second portion of the master configuration data different from the first portion based on the second variant data. For example, if a user equipment requests a regional variant channel lineup and associated mapping data appropriate for the sub-region in which the user equipment is located, the media guidance application may transmit the corresponding variant channel lineup and associated mapping data to the user equipment. Upon receipt of the variant channel lineup and associated mapping data, the user equipment may generate a complete channel lineup by applying the variant channel lineup and associated mapping data to the master channel lineup, overwriting specific entries in the master channel lineup data with corresponding entries in the variant channel lineup data.

In some embodiments, the master configuration data is a media source lineup, and the first user equipment generates the first configuration data by determining the first portion of the media source lineup corresponding to the first regional variant data. For example, each entry in the media source lineup may identify the program described thereby. Each entry in the regional variant data may have a similar program identifier. The first user equipment may access the identifiers of the regional variant data and locate matching identifiers in the master source lineup. The first user equipment may overwrite the first portion of the master source lineup with the first regional variant data to generate configuration data specific to the sub-region in which the first user equipment is located.

In some embodiments, the first user equipment generates the first configuration data by determining a portion of the first regional variant data that does not correspond to any portion of the media source lineup. For example, the first user equipment may access an identifier of a portion of the first regional variant data, and determine that no matching identifier is present in the media source lineup. The first user equipment may add the portion of the first regional variant data to the media source lineup to generate configuration data specific to the sub-region in which the first user equipment is located.

In some embodiments, the master configuration data includes an indicator that at least a portion of the master configuration data should be overwritten with the first regional variant data. For example, each portion of the master configuration data may include a flag or other variable that indicates that regional variant data exists for that portion. The flag or variable may further identify a specific sub-region or plurality of sub-regions for which regional variant data should replace the master configuration data. In some embodiments, user equipment may request the regional variant data in response to detecting the indicator. For example, the user equipment may search the master configuration data for the flags or variables indicating the existence of regional variant data for portions of the master configuration data. The user equipment may compare the sub-region or plurality of sub-regions identified by the flag or variable of each portion with a sub-region identifier of the user equipment. If any portion of the master configuration data has a flag or variable which identifies the sub-region of the user equipment, the user equipment may transmit a request to a server for the regional variant data.

In some embodiments, the master configuration data includes a plurality of pointers, each pointer of the plurality of pointers identifying a memory address of regional variant data. The user equipment may request the regional variant data by accessing a sub-region identifier of the user equipment and determining whether a pointer of the plurality of pointers identifies the memory address of regional variant data for the sub-region of the user equipment. For example, a pointer of the plurality of pointers may include a memory location, resource locator, or other address from which the user equipment may retrieve regional variant data for the sub-region in which the user equipment is located. The user equipment may, in response to determining that a pointer of the plurality of pointers identifies the memory address of regional variant data for the sub-region of the user equipment, transmit to the server a request for the regional variant data from the memory address identified by the pointer.

In some embodiments, the media guidance application may generate for display in an administrative user interface a list of configuration data corresponding to the master configuration data. For example, an administrative interface may list a plurality of programs in a media source lineup, and the information needed to locate the programs within a media stream or plurality of media streams. The media guidance application may receive input, from the administrative interface, to modify a portion of the master configuration data. For example, a user of the administrative interface may select a listed program in order to add regional variant data for the selected program. To do so, a user may modify the existing configuration data for the selected program. In response to receiving the input, the media guidance application may generate regional variant data comprising the modified portion of the master configuration data. For example, while the master configuration data may include hundreds of programs, the user of the administrative interface may modify configuration data of only a single program for a given sub-region. Therefore, the regional variant data for the given sub-region may contain only the modified configuration data pertaining to the single program. The media guidance application may store the regional variant data for transmission to user equipment. For example, the media guidance application may store the regional variant data on a server accessible by user equipment.

In some embodiments, the media guidance application may receive input from the administrative interface to add new configuration data to the master configuration data. For example, if a new media source is made available to user equipment, the master configuration data must be updated to include data required to access the new media source. In response to receiving the input, the media guidance application may generate updated master configuration data and, if modified data is also received, updated regional variant data. The media guidance application may then transmit the updated master configuration data to user equipment.

In some embodiments, in response to receiving the updated master configuration data, user equipment may update its configuration data by comparing the master configuration data with the updated master configuration data and identifying configuration data of the updated master configuration data that do not appear in the master configuration data. For example, if HBO were added to the media source lineup, the user equipment may identify the portion of the updated master configuration data corresponding to HBO, which does not appear in the existing master configuration data. The user equipment may repeat the process described above to retrieve updated regional variant data. The user equipment may determine if an indicator, flag, or variable of the identified portion of the updated configuration data matches the sub-region in which the user equipment is located, and transmit a request to the server for updated regional variant data.

It should also be noted that the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an illustrative display screen that may be user to generate regional variant data, in accordance with some embodiments of the disclosure;

DETAILED DESCRIPTION

Figure 1:
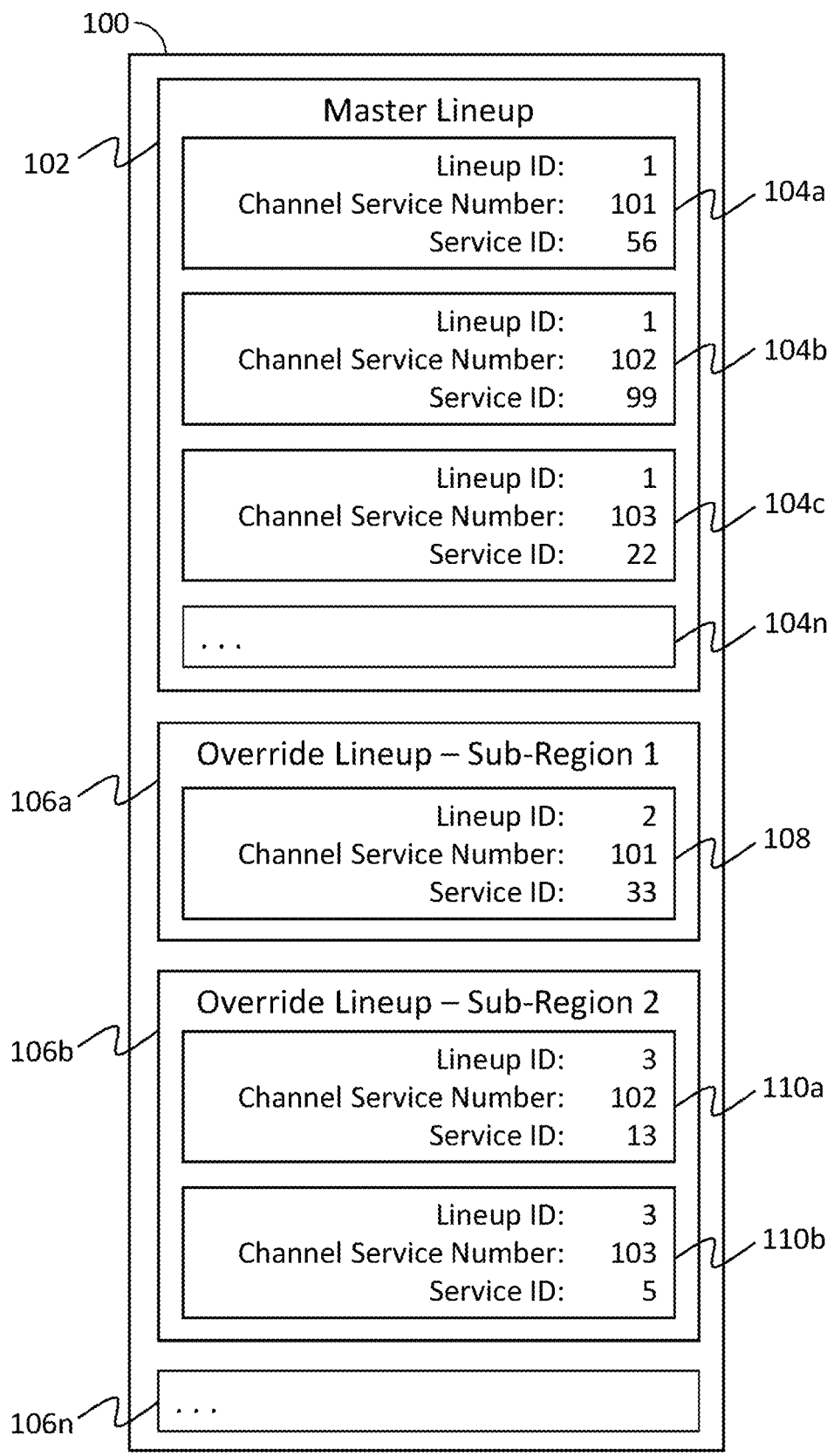
FIG. 1 is a block diagram representing a configuration data structure, in accordance with some embodiments of the disclosure.

Systems and methods are described herein for storing configuration data as a set of master configuration data and override data where one set of configuration data is defined as the master and every other set of configuration data is defined as override configuration data. Configuration data may be data required by user equipment to access services or resources provided by a service provider, such as access codes, resource locations, software and/or firmware packages, or any other required data that is not permanently stored or encoded on user equipment. The master configuration data may be stored in a specific database table, or in a stand-alone data file on a server. The master configuration data may include any data required by user equipment to access content. Master configuration data may be the most common configuration data required by user equipment to access services and/or resources. For example, the configuration data may be a channel lineup. A channel lineup may be a listing of available channels and associated data required for user equipment to access each channel. For example, channels may be delivered to user equipment in a plurality of physical channels (e.g., a 6-MHz band transmitted over a coaxial cable). Within each physical channel, an MPEG-2 stream may be transmitted, which in turn encapsulates several programs. Each program may be identified by, for example, a specific identifier in a packet header. Channel lineup data may thus include the physical channel and packet identifiers for each available channel. The channel lineup information may be stored in a specific database table for each and every channel in the lineup. Override data may be those data which are different from the most common configuration data, but which are required for a subset of user equipment. For example, override data may be a channel lineup specific to a certain geographical area or other subset of user equipment. Each override lineup may include information about a channel or set of channels in a specific database table, separate from the master lineup data.

For example, a media guidance application may receive, generate, or otherwise access (e.g., using control circuitry of a media device) master configuration data for the geographical region. For example, the geographical region may be an area encompassing New York, New Jersey, Pennsylvania, and Connecticut. The geographical region may include several sub-regions. For example, the geographical region described above may include sub-regions for each state. The geographical region may include several sub-regions for various portions of larger states, such as New York and Pennsylvania. Using the example of a channel lineup, the media guidance application may compile a list of each channel distributed by a media system, and information about how each channel is encoded, which may include format information (e.g., transmission format, video resolution, audio sampling rate, and other media-related data) as well as access information (e.g., subscription requirements, stream identifiers and packet identifiers). The media guidance application may then identify, based on user input, a subset of the configuration data that should be different for a particular sub-region, and generate override data for that sub-region containing only the configuration data that is different from the identified subset of master configuration data. For example, user equipment in a particular sub-region may require a specific transmission format. As another example, a particular channel or set of channels may have a different stream identifier in a particular sub-region. The media guidance application may access a database of known parameters for each channel in each sub-region and compare them with corresponding parameters in the master configuration data. The media guidance application may generate override data for a particular sub-region consisting of all differences between the master configuration data and the configuration data for that particular sub-region. The media guidance application may then store both the master configuration data and the override data on a server for access by user equipment. Upon receiving the master configuration data, user equipment may request and/or retrieve the override data for the sub-region in which the user equipment is located. Based on the override data, the user equipment may generate configuration data specific to the sub-region by overwriting portions of the master configuration data with corresponding portions of the override data.

As an example, a media system may serve a geographical region comprising several sub-regions. All sub-regions within the geographical region may receive several media streams. Some of the media streams may be identical, and some may differ. For example, user equipment of a first sub-region may receive five media streams, each comprising ten programs. User equipment in a second sub-region may also receive five media streams, three of which may be identical to those received by user equipment in the first sub-region, and two may be different. For example, user equipment in the first sub-region may receive programs 001, 002, and 003 in one stream, and programs 004, 005, and 006 in a second stream, while user equipment in the second sub-region may receive programs 001, 002, and 006 in one stream, and programs 003, 004, and 005 in a second stream. Master configuration data, which may be, for example, a channel lineup and associated mapping data that is most common across all sub-regions, may be stored on a server, along with regional variant data which includes any changes from the master configuration data that are required to correct the data for a particular sub-region. The master configuration data may be sent to all user equipment in every sub-region in the geographical region. User equipment in each sub-region may request the regional variant data for their respective sub-region, and overwrite portions of the master configuration data with the corresponding portions of the regional variant data.

When files are generated for use by user equipment, the same master and override concept is applied. First a master configuration file is generated with a full set of configuration data contained in the file. Each override configuration is analyzed, and the necessary files are generated containing only those data that are unique to the given override configuration. If an override configuration does not have any overrides, it will not require any override files. The end result is a master configuration data file on a data carousel along with smaller override configuration data files for each override configuration containing differences from the master configuration. User equipment can retrieve and load the master configuration data file and then apply any necessary changes if there is an appropriate override configuration data file. If there is no override configuration data file needed, the master configuration data will be used without modification.

To generate user equipment configuration data specific to a sub-region of a geographical region, a media guidance application may be configured to transmit master configuration data to first user equipment and to second user equipment of the geographical region. For example, a headend or data carousel may transmit a master channel lineup to user equipment (e.g., set-top boxes) in a geographical region served by the headend or data carousel. FIG. 1 is a block diagram representing a configuration data structure, in accordance with some embodiments of the disclosure. The headend, data carousel (i.e., a server or other file hosting device which continuously delivers data to user equipment), or other server 100 may store master lineup 102. Master lineup 102 may contain a plurality of media source configuration data 104a-104n. The headend, data carousel, or other server 100 may also store a number of override lineups (e.g., override lineups 106a-106n). Each override lineup may contain a plurality of media source configuration data unique to a particular sub-region of the geographical region served by the headend, data carousel, or server 100. For example, override lineup 106a may be associated with a first sub-region and contain media source configuration data 108, while override lineup 106b may be associated with a second sub-region and contain media source configuration data 110a and 110b.

Figure 2:
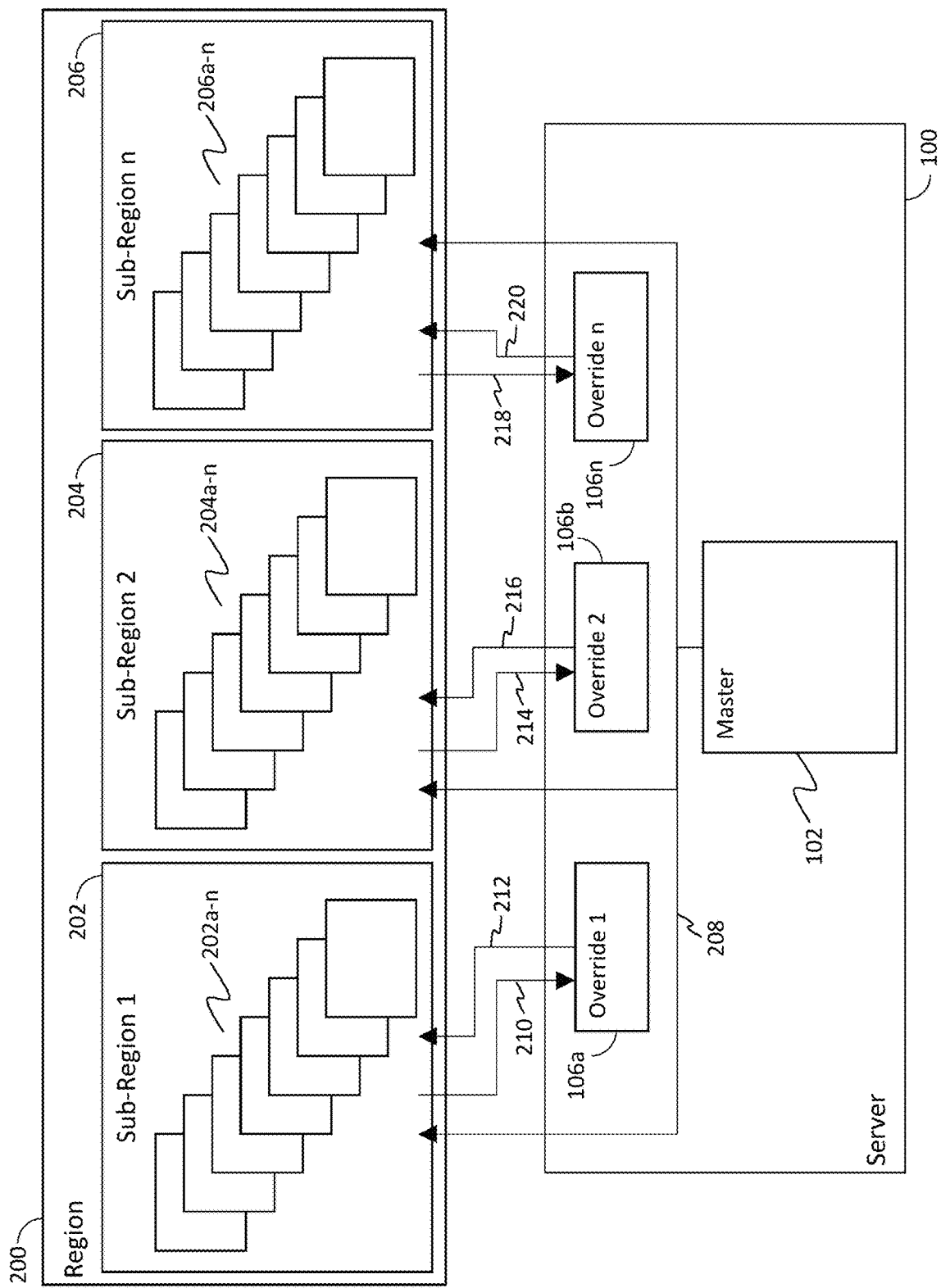
FIG. 2 is a block diagram representing the flow of configuration data, in accordance with some embodiments of the disclosure.

FIG. 2 is a block diagram representing a plurality of sub-regions 202, 204, and 206. Each sub-region includes a plurality of user equipment 202a-n, 204a-n, and 206a-n. Master configuration data may be transmitted 208 to each user equipment in each sub-region. The media guidance application may be configured to receive a first request (e.g., request 210) from first user equipment (e.g., user equipment 202a) for first variant data (e.g., override lineup 106a) specific to a sub-region (e.g., sub-region 202) of the geographical region 200 in which the first user equipment 202a is used, and a second request (e.g., request 214) from second user equipment (e.g., user equipment 204a) for second variant data (e.g., override lineup 106b) specific to a second sub-region (e.g., sub-region 204) of the geographical region 200 in which the second user equipment 204a is used. For example, while the first user equipment 202a and second user equipment 204a may be in the same geographical region 200, each may be located in a different sub-region (e.g., sub-region 202 and sub-region 204, respectively). Each sub-region may have a different channel lineup, different channels may be delivered on different streams, or channels may be delivered with different identifiers within a stream. For example, channels may be delivered in an MPEG-2 transport stream which encapsulates five separate channels. In order to access a particular channel, user equipment devices must access packets with a particular program identifier associated with the desired channel. An identifier for a given channel, such as the channel "ABC", may differ between sub-regions, requiring different configuration data for ABC in each sub-region. As another example, channels may be delivered in several different MPEG-2 transport streams, and ABC may be delivered in a first transport stream in one sub-region, while being delivered in a second, non-identical transport stream in a different sub-region. Thus, user equipment devices require slight modifications to the master channel lineup and associated mapping data in order to access some channels. User equipment may therefore request regional variant or override data representing the differences between the master channel lineup and the channel lineup of the appropriate sub-region.

In response to receiving request 210, the media guidance application may be configured to determine whether the first regional variant data 106a is available. For example, the media guidance application may query a database or other data structure located on headend, data carousel or server 100 for the presence of regional variant data (e.g., override lineup 106a) for the sub-region 202 from which the first request 210 was received. In response to determining that the first regional variant data is available, the media guidance application may transmit 212 the first regional variant data 106a to the first user equipment 202a. The first user equipment 202a generates first configuration data specific to the first sub-region 202 by modifying a first portion of the master configuration data 102 based on the first variant data 106a. Similarly, in response to receiving the second request 214, the media guidance application may be configured to determine if the second regional variant data 106b is available, and to transmit 216 the second regional variant data 106b to the second user equipment 204a. The second user equipment 204a similarly generates second configuration data specific to the second sub-region 204 by modifying a second portion of the master configuration data 102 different from the first portion based on the second variant data 106b.

For example, if a user equipment 202a requests regional variant channel lineup and associated mapping data 106a appropriate for the sub-region 202 in which the user equipment 202a is located, the media guidance application may transmit 212 the corresponding variant channel lineup and associated mapping data 106a to the user equipment 202a. Upon receipt of the variant channel lineup and associated mapping data 106a, the user equipment 202a may generate a complete channel lineup by applying the variant channel lineup and associated mapping data 106a to the master channel lineup 102, overwriting specific entries in the master channel lineup data 102 with corresponding entries in the variant channel lineup data 106a.

In some embodiments, the master configuration data 102 is a media source lineup, and the first user equipment 202a generates the first configuration data by determining the first portion of the media source lineup 102 corresponding to the first regional variant data 106a. For example, each entry in the media source lineup 102 may identify the program described thereby. Each entry in the regional variant data 106a may have a similar program identifier. The first user equipment 202a may access the identifiers of the regional variant data 106a and locate matching identifiers in the master source lineup 102. The first user equipment 202a may overwrite the first portion of the master source lineup 102 with the first regional variant data 106a to generate configuration data specific to the sub-region 202 in which the first user equipment 202a is located.

In some embodiments, the first user equipment 202a generates the first configuration data by determining a portion of the first regional variant data 106a that does not correspond to any portion of the media source lineup 102. For example, the first user equipment 202a may access an identifier of a portion of the first regional variant data 106a, and determine that no matching identifier is present in the media source lineup 102. The first user equipment 202a may add the portion of the first regional variant data 106a to the media source lineup 102 to generate configuration data specific to the sub-region 202 in which the first user equipment 202a is located.

In some embodiments, the master configuration data 102 includes an indicator that at least a portion of the master configuration data 102 should be overwritten with the first regional variant data 106a. For example, each portion of the master configuration data 102 may include a flag or other variable that indicates that regional variant data exists for that portion. The flag or variable may further identify a specific sub-region or plurality of sub-regions for which regional variant data should replace the master configuration data 102. In some embodiments, user equipment 202a may request the regional variant data 106a in response to detecting the indicator. For example, the user equipment may search the master configuration data 102 for the flags or variables indicating the existence of regional variant data 106a for portions of the master configuration data 102. The user equipment may compare the sub-region or plurality of sub-regions identified by the flag or variable of each portion with a sub-region identifier of the user equipment 202a. If any portion of the master configuration data 102 has a flag or variable which identifies the sub-region 202 of the user equipment 202a, the user equipment 202a may transmit a request 210 to a server 100 for the regional variant data 106a.

In some embodiments, the master configuration data 102 includes a plurality of pointers, each pointer of the plurality of pointers identifying a memory address of regional variant data. The user equipment 202a may request the regional variant data 106a by accessing a sub-region identifier of the user equipment 202a and determining whether a pointer of the plurality of pointers identifies the memory address of regional variant data 106a for the sub-region 202 of the user equipment 202a. For example, a pointer of the plurality of pointers may include a memory location, resource locator, or other address from which the user equipment 202a may retrieve regional variant data 106a for the sub-region 202 in which the user equipment 202a is located. The user equipment 202a may, in response to determining that a pointer of the plurality of pointers identifies the memory address of regional variant data 106a for the sub-region 202 of the user equipment, transmit to the server a request 210 for the regional variant data 106a from the memory address identified by the pointer.

By using a graphical user interface to manage both the master and override configuration data, master configuration data can first be created to contain all configuration data that will be common to every configuration in the region. Each override configuration can then be configured with only those data that are different from the master configuration. These overrides include configuration data that contain different attributes from the master configuration or configuration data that have been added to the override configuration that do not exist within the master configuration data. The override configuration stores only these individual overrides within the database in contrast to the master configuration, which stores all configuration data. If an override lineup is meant to be identical to the master lineup, there will simply be no data storage at all for that lineup.

FIG. 3 shows an illustrative administrative interface 300 which may be used to configure regional variant data. In some embodiments, the media guidance application may generate for display in an administrative user interface 300 a list of configuration data corresponding to the master configuration data. For example, an administrative interface 300 may list a plurality of programs (e.g., programs 304, 306, 308, and 310) in a media source lineup, and the information needed to locate the programs within a media stream or plurality of media streams. The media guidance application may receive input, from the administrative interface 300, to modify a portion of the master configuration data 102. For example, a user of the administrative interface 300 may select a listed program (e.g., program 310) in order to add regional variant data for the selected program. For example, a user of administrative interface 300 may select an "Add Override" button, such as button 302, for a program for which regional variant data must be entered. Upon selecting the button, the user may choose which sub-region or sub-regions for which regional variant data is to be configured by selecting the sub-region or sub-regions from a menu 312. The user may then modify the existing configuration data for the selected program and store the modified data as regional variant data. If regional variant data for a selected sub-region already exists, the media guidance application may append the newly configured data to the appropriate regional variant data. The media guidance application may alter display of the administrative interface 300 to highlight or otherwise visually indicate programs for which regional variant data have been configured. For example, programs 304, 306, and 308 are displayed in FIG. 3 as highlighted, indicating that regional variant data for those programs have already been configured. While the master configuration data 102 may include hundreds of programs, the user of the administrative interface 300 may modify configuration data of only a single program for a given sub-region. Therefore, the regional variant data for the given sub-region may contain only the modified configuration data pertaining to the single program.

In some embodiments, the media guidance application may receive input from the administrative interface 300 to add new configuration data to the master configuration data 102. For example, if a new media source is made available to user equipment, the master configuration data 102 must be updated to include data required to access the new media source. In response to receiving the input, the media guidance application may generate updated master configuration data and, if modified data is also received, updated regional variant data. The media guidance application may then transmit the updated master configuration data to user equipment.

In some embodiments, in response to receiving the updated master configuration data, user equipment may update its configuration data by comparing the master configuration data with the updated master configuration data and identifying configuration data of the updated master configuration data that do not appear in the master configuration data 102. For example, if HBO were added to the media source lineup, the user equipment may identify the portion of the updated master configuration data corresponding to HBO which does not appear in the existing master configuration data 102. The user equipment may repeat the process described above to retrieve updated regional variant data. The user equipment may determine if an indicator, flag, or variable of the identified portion of the updated configuration data matches the sub-region in which the user equipment is located, and transmit a request to the server for updated regional variant data.

In order to provide proper media guidance data, user equipment must be provided with configuration data specific for the region and sub-region in which the user equipment is located. Additional configuration data may also be needed for different subscription packages, some of which may include content which is not normally available to subscribers of other packages. Configuration data may be stored and transmitted to user equipment as a set of master data and override data where one set of configuration data is defined as the master and every other set of configuration data is defined as override configuration data. For the master configuration data, all information may be stored in a specific database table. For example, the configuration data may be a channel lineup. All channel lineup information may be stored in a specific database table for each and every channel in the lineup. Similarly, each override lineup may store information about a channel or set of channels in a specific database table, separate from the master lineup data. By default, an override lineup would store nothing at all, as it stores only those data which are different from the master channel lineup.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
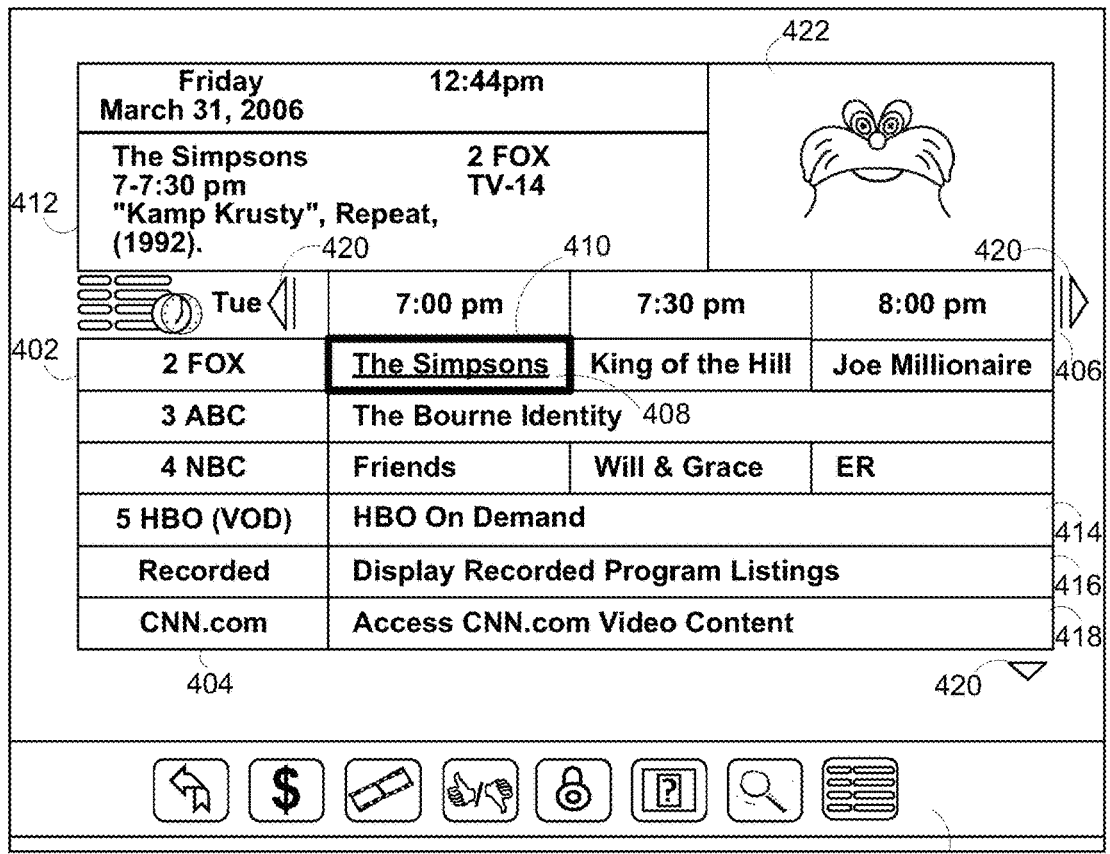
FIG. 4 shows an illustrative display screen that may be used to provide media guidance data, in accordance with some embodiments of the disclosure.
Figure 5:
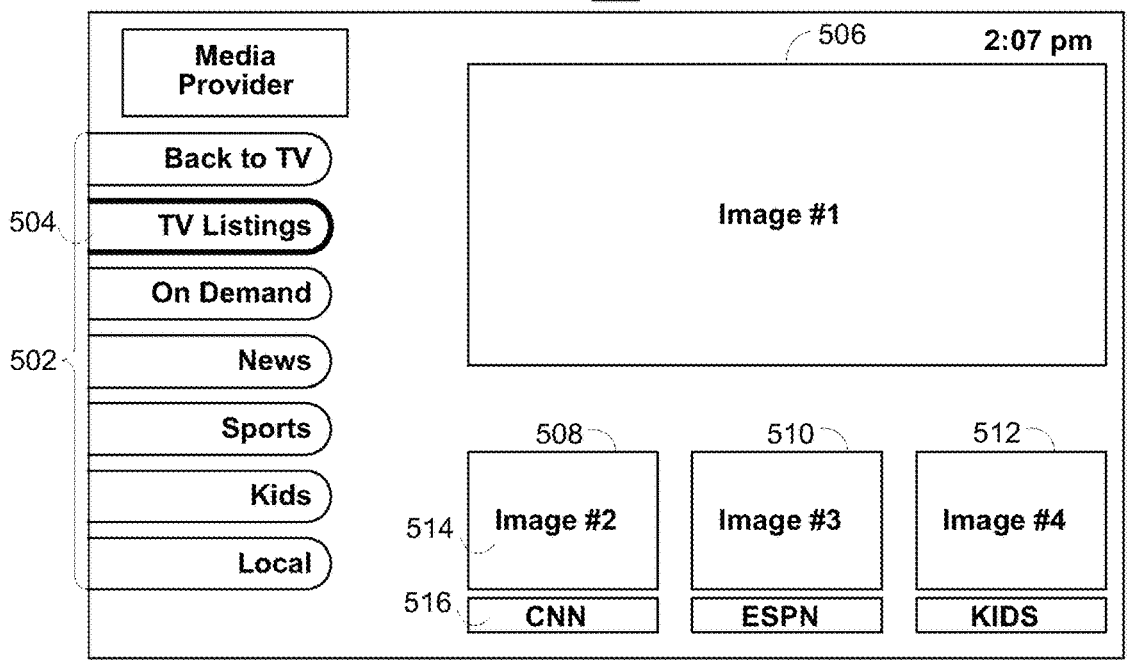
FIG. 5 shows an illustrative display screen that may be used to provide media guidance data, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows an illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
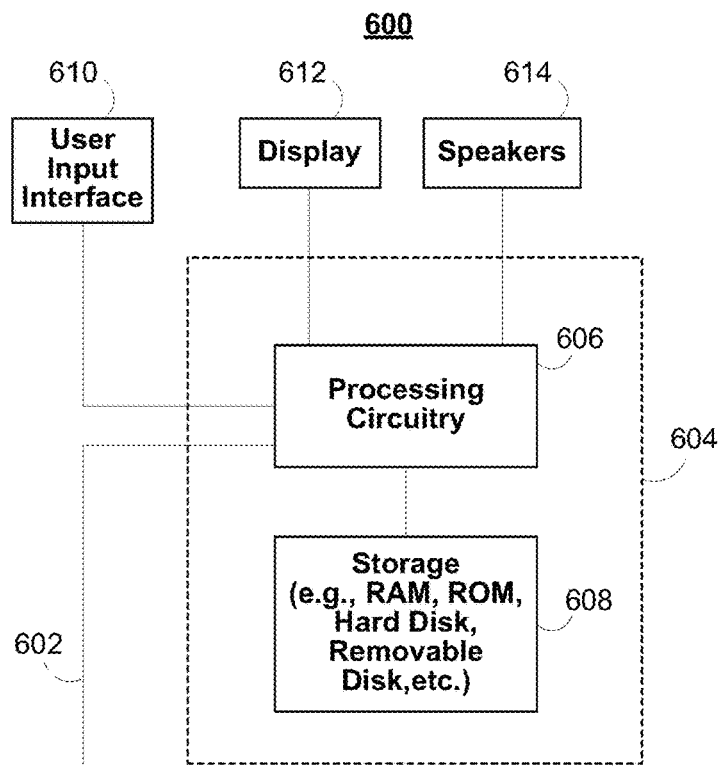
FIG. 6 shows a generalized embodiment of a stand-alone device, in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
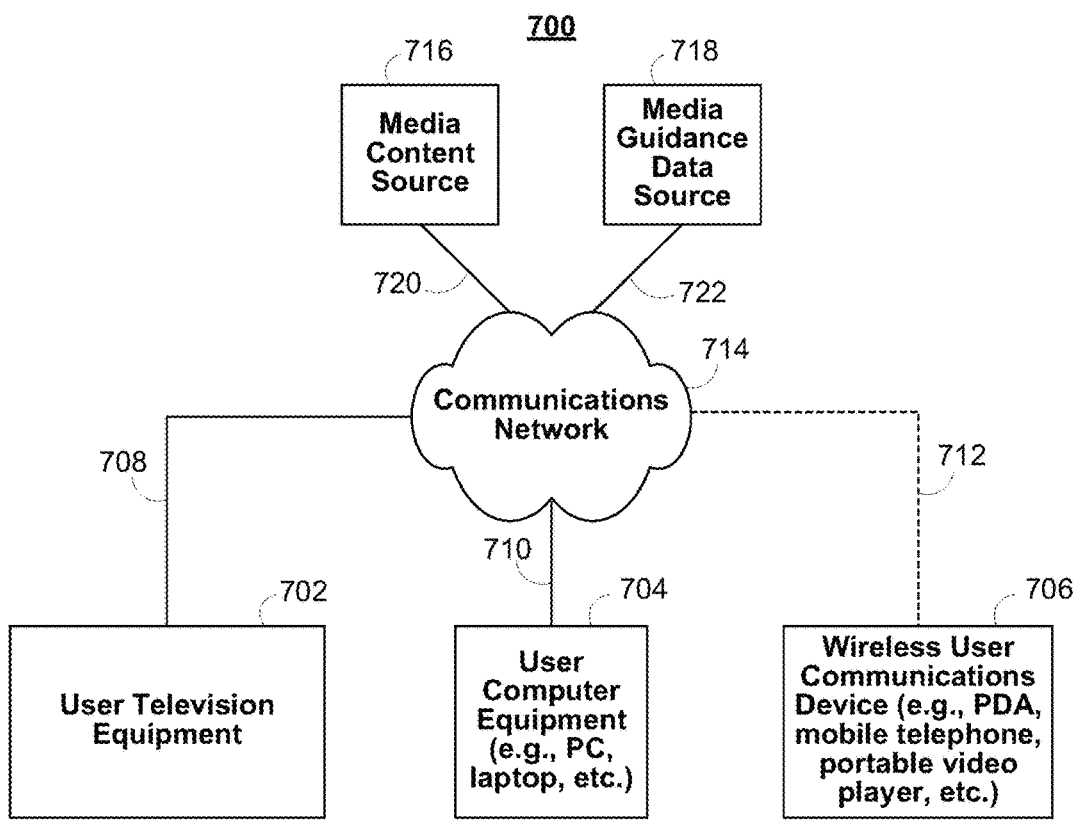
FIG. 7 shows a specific implementation of user devices, in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications networks or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
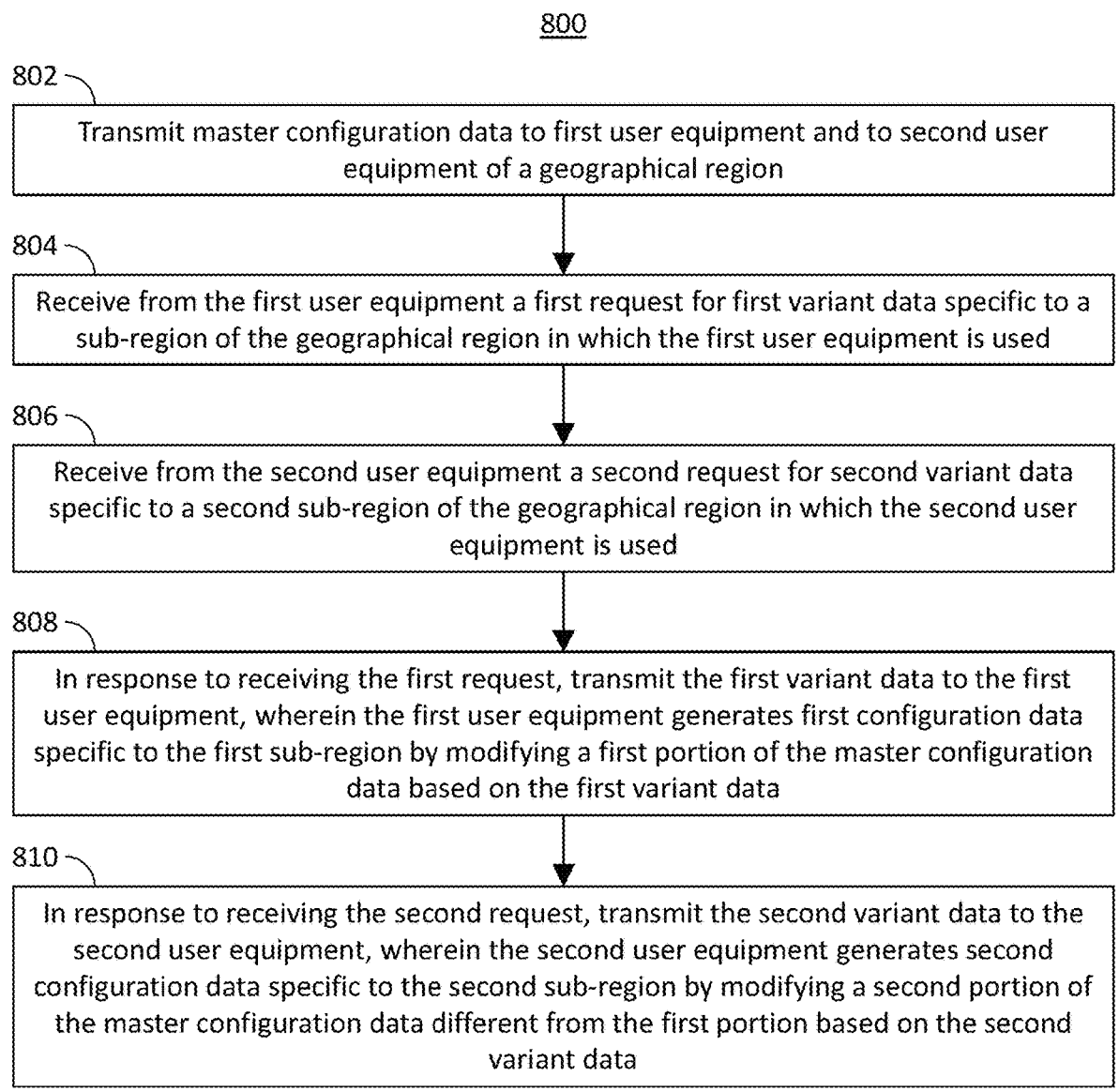
FIG. 8 is a flowchart representing a process for generating user equipment configuration data specific to a sub-region of a geographical region, in accordance with some embodiments of the disclosure.

FIG. 8 is a flowchart representing an illustrative process for generating user equipment configuration data specific to a sub-region of a geographical region in accordance with some embodiments of the disclosure. The flowchart in FIG. 8 represents a process 800 implemented on control circuitry 604 for generating user equipment configuration data specific to a sub-region of a geographical region according to an embodiment of the disclosure. It should be noted that process 800 or any action thereof could be performed on, or provided by, any of the devices shown in FIGS. 6-7. For example, process 800 may be executed by control circuitry 604 (FIG. 6) as instructed by a media guidance application implemented on a server (e.g., media content source 716 and/or media guidance data source 718 (FIG. 7)) in order to generate user equipment configuration data specific to a sub-region of a geographical region. In addition, one or more actions of process 800 may be incorporated into or combined with one or more actions of any other process or embodiment described herein.

At 802, control circuitry 604 may be configured to transmit master configuration data 102 from a server, such as headend, data carousel, or server 100, media content source 716, or media guidance data source 718, to first user equipment 202a (e.g., user equipment 702, 704, 706) and second user equipment 204a (e.g., user equipment 702, 704, 706) of a geographical region 200. For example, control circuitry 604 may transmit the master configuration data 102, via communications network 714 to user equipment 202a and 204a (e.g., user equipment 702, 704, 706). The master configuration data 102 may be transmitted using any suitable transmission protocol supported by communications network 714, such as Hypertext Transfer Protocol (HTTP), File Transfer Protocol (FTP), SSH File Transfer Protocol (SFTP), Secure Copy (SCP), FTP over SSL (FTPS), HTTP over SSL (HTTPS), Web Distributed Authoring and Versioning (WebDAV), AS2, and Accelerated File Transfer Protocol (AFTP).

At 804, control circuitry 604 may be configured to receive, via communications network 714, from the first user equipment 202a a first request 210 for first variant data 106a specific to a sub-region 202 of the geographical region 200 in which the first user equipment 202a is used. At 806, control circuitry 604 may be configured to receive from the second user equipment 204a, via communications network 714, a second request 214 for second variant data 106b specific to a second sub-region 204 of the geographical region 200 in which the second user equipment 204a is used. For example, while the first user equipment 202a and second user equipment 204a may be in the same geographical region 200, each may be located in a different sub-region. Each sub-region may have a different channel lineup, different channels may be delivered on different streams, or channels may be delivered with different identifiers within a stream. For example, channels may be delivered in an MPEG-2 transport stream which encapsulates five separate channels. In order to access a particular channel, user equipment devices must access packets with a particular program identifier associated with the desired channel. An identifier for ABC may differ between sub-regions, requiring different configuration data for ABC in each sub-region. As another example, channels may be delivered in several different MPEG-2 transport streams, and ABC may be delivered in a first transport stream in one sub-region, while being delivered in a second, non-identical transport stream in a different sub-region. Thus, user equipment devices require slight modifications to the master channel lineup and associated mapping data in order to access some channels. User equipment may therefore request regional variant or override data representing the differences between the master channel lineup and the channel lineup of the appropriate sub-region. First user equipment 202a may access, from a memory of first user equipment 202a, an indicator, variable, or other data identifying the particular sub-region in which the first user equipment 202a is located, and transmit a request 210, via communications network 714 to headend, data carousel, or server 100, media content source 716, or media guidance data source 718.

At 808, in response to receiving the first request 210, control circuitry 604 may be configured to transmit 212 the first variant data 106a to the first user equipment 202a, via the communications network 714. The first user equipment 202a may generate configuration data specific to the first sub-region 202 by modifying a first portion of the master configuration data 102 based on the first variant data 106a. For example, the first user equipment 202a may overwrite portions of the master configuration 102, or add additional configuration data to the master configuration data 102, as will be described below in further detail.

At 810, in response to receiving the second request 214, control circuitry 604 may be configured to transmit 216 the second variant data 106b to the second user equipment 204a, via the communications network 714. The second user equipment 204a may generate second configuration data specific to the second sub-region 204 by modifying a second portion of the master configuration data 102 different from the first portion based on the second variant data 106b. Again, as will be described below, the second user equipment may overwrite portions of, or add data to, the master configuration data 102.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 6-7 could be used to perform one or more of the actions in FIG. 8.

Figure 9:
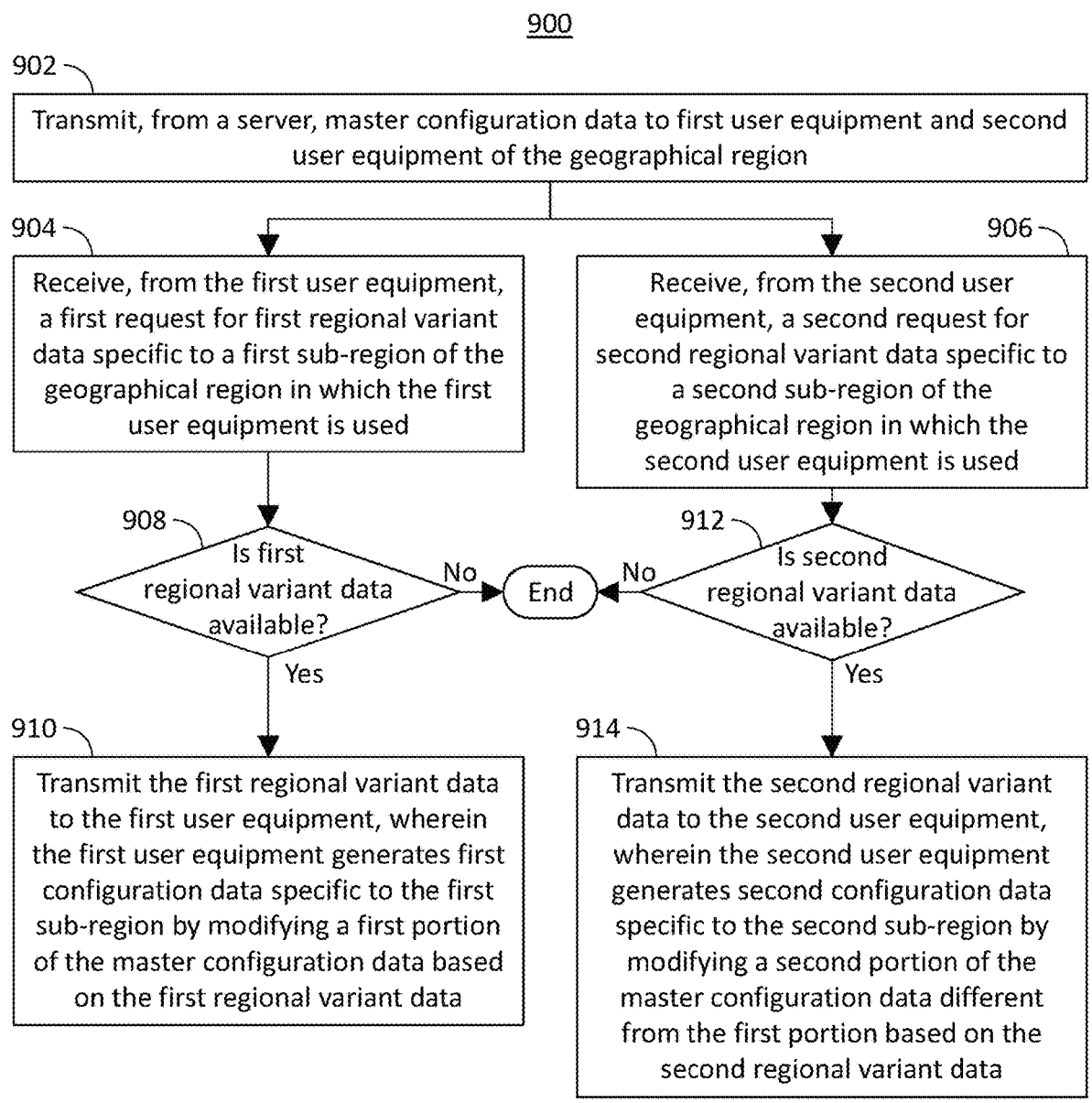
FIG. 9 is a flowchart representing a process for generating user equipment configuration data specific to a sub-region of a geographical region, in accordance with some embodiments of the disclosure.

FIG. 9 is a flowchart representing an illustrative process for generating user equipment configuration data specific to a sub-region of a geographical region in accordance with some embodiments of the disclosure. The flowchart in FIG. 9 represents a process 900 implemented on control circuitry 604 for generating user equipment configuration data specific to a sub-region of a geographical region according to an embodiment of the disclosure. It should be noted that process 900 or any action thereof could be performed on, or provided by, any of the devices shown in FIGS. 6-7. For example, process 900 may be executed by control circuitry 604 (FIG. 6) as instructed by a media guidance application implemented on a server (e.g., media content source 716 and/or media guidance data source 718 (FIG. 7)) in order to generate user equipment configuration data specific to a sub-region of a geographical region. In addition, one or more actions of process 900 may be incorporated into or combined with one or more actions of any other process or embodiment described herein.

At 902, control circuitry 604 may be configured to transmit 208, from a server 100, via communications network 714, master configuration data 102 to first user equipment 202a and second user equipment 204a of the geographical region 200. The master configuration data 102 may be transmitted using any suitable transmission protocol supported by communications network 714, such as Hypertext Transfer Protocol (HTTP), File Transfer Protocol (FTP), SSH File Transfer Protocol (SFTP), Secure Copy (SCP), FTP over SSL (FTPS), HTTP over SSL (HTTPS), Web Distributed Authoring and Versioning (WebDAV), AS2, and Accelerated File Transfer Protocol (AFTP).

At 904, control circuitry 604 may be configured to receive, from the first user equipment 202a, via communications network 714, a first request 210 for first regional variant data 106a specific to the sub-region 202 of the geographical region 200 in which the first user equipment 202a is used. At 906, control circuitry 604 may be configured to receive, from the second user equipment 204a, a second request 214 for second regional variant data 106b specific to the sub-region 204 of the geographical region 200 in which the second user equipment 204a is used. For example, while the first user equipment 202a and second user equipment 204a may be in the same geographical region 200, each may be located in a different sub-region. Each sub-region may have a different channel lineup, different channels may be delivered on different streams, or channels may be delivered with different identifiers within a stream. For example, channels may be delivered in an MPEG-2 transport stream which encapsulates five separate channels. In order to access a particular channel, user equipment devices must access packets with a particular program identifier associated with the desired channel. An identifier for ABC may differ between sub-regions, requiring different configuration data for ABC in each sub-region. As another example, channels may be delivered in several different MPEG-2 transport streams, and ABC may be delivered in a first transport stream in one sub-region, while being delivered in a second, non-identical transport stream in a different sub-region. Thus, user equipment devices require slight modifications to the master channel lineup and associated mapping data in order to access some channels. User equipment may therefore request regional variant or override data representing the differences between the master channel lineup and the channel lineup of the appropriate sub-region. First user equipment 202a may access, from a memory of first user equipment 202a, an indicator, variable, or other data identifying the particular sub-region in which the first user equipment 202a is located, and transmit a request 210, via communications network 714 to headend, data carousel, or server 100, media content source 716, or media guidance data source 718.

At 908, control circuitry 604 may be configured to determine if the first regional variant data 106a is available. For example, control circuitry 604 may access an index, database, or data structure cataloging the available configuration data for each sub-region of the geographical region 200. User equipment in some sub-regions may be fully operable using only the master configuration data 102 without any regional variant data. Control circuitry 604 may not generate regional variant data for such sub-regions. Therefore, regional variant data for some sub-regions may not be available. If regional variant data for the first sub-region 202 is not available, control circuitry 604 may transmit a response to the request 210 received from the first user equipment 202a indicating that no regional variant data is available.

At 910, in response to determining that the first regional variant data 106a is available, control circuitry 604 may be configured to transmit 212 the first regional variant data 106a to the first user equipment 202a, via the communications network 714. The first user equipment 202a may generate first configuration data specific to the first sub-region 202 by modifying a first portion of the master configuration data 102 based on the first regional variant data 106a. For example, the first user equipment 202a may overwrite portions of the master configuration 102, or add additional configuration data to the master configuration data 102, as will be described below in further detail.

At 912, control circuitry 604 may be configured to determine if the second regional variant data 106b is available. This may be accomplished using the methods described above.

At 914, in response to determining that the second regional variant data 106b is available, control circuitry 604 may be configured to transmit 216 the second regional variant data 106b to the second user equipment 204a, via the communications network 714. The second user equipment 204a may generate second configuration data specific to the second sub-region 204 by modifying a second portion of the master configuration data 102 based on the second regional variant data 106b. Again, as will be described below, the second user equipment may overwrite portions of, or add data to, the master configuration data 102.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 6-7 could be used to perform one or more of the actions in FIG. 9.

Figure 10:
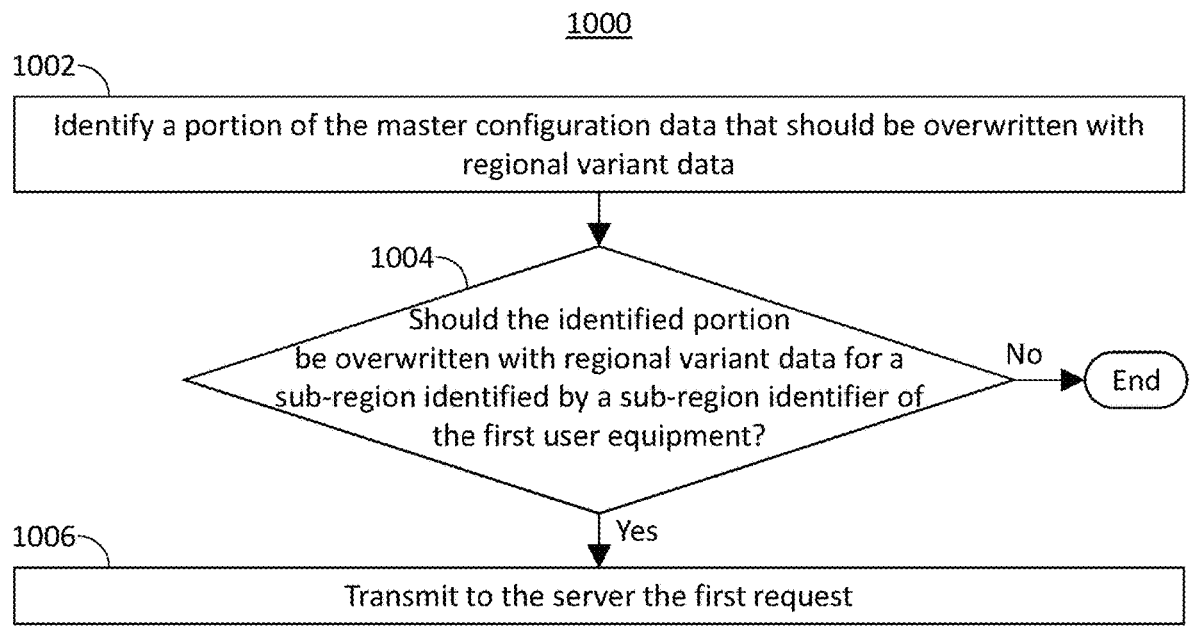
FIG. 10 is a flowchart representing a process for requesting regional variant data, in accordance with some embodiments of the disclosure.

FIG. 10 is a flowchart representing an illustrative process for requesting regional variant data in accordance with some embodiments of the disclosure. The flowchart in FIG. 10 represents a process 1000 implemented on control circuitry 604 for requesting regional variant data according to an embodiment of the disclosure. It should be noted that process 1000 or any action thereof could be performed on, or provided by, any of the devices shown in FIGS. 6-7. For example, process 1000 may be executed by control circuitry 604 (FIG. 6) as instructed by a media guidance application implemented on a user device (e.g., user equipment devices 702, 704, and/or 706 (FIG. 7), or user equipment 202a-n, 204a-n, and/or 206a-n (FIG. 2)) in order to request regional variant data. In addition, one or more actions of process 1000 may be incorporated into or combined with one or more actions of any other process or embodiment described herein.

At 1002, the first user equipment 202a may be configured to identify a portion of the master configuration data 102 that should be overwritten with regional variant data. For example, the master configuration data 102 may include an indicator that at least a portion of the master configuration data 102 should be overwritten with the first regional variant data 106a. For example, each portion of the master configuration data 102 may include a flag or other variable that indicates that regional variant data exists for that portion. The flag or variable may further identify a specific sub-region or plurality of sub-regions for which regional variant data should replace the master configuration data 102.

At 1004, the first user equipment 202a may be configured to determine whether the identified portion of the master configuration data 102 should be overwritten with regional variant data 106a for the sub-region 202 identified by a sub-region identifier of the first user equipment 202a. For example, the first user equipment 202a may determine whether a sub-region identified in the master configuration data 102 is that same as the sub-region in which the first user equipment 202a is located. For example, the user equipment may search the master configuration data 102 for the flags or variables indicating the existence of regional variant data 106a for portions of the master configuration data 102.

At 1006, in response to determining that the identified portion of the master configuration data 102 should be overwritten with regional variant data 106a for the sub-region 202 identified by a sub-region identifier of the first user equipment 202a, first user equipment 202a may be configured to transmit to the server 100 the first request 210. For example, the first user equipment 202a may request the regional variant data 106a in response to detecting the indicator. For example, if any portion of the master configuration data 102 has a flag or variable which identifies the sub-region 202 of the user equipment 202a, the user equipment 202a may transmit a request 210 to a server 100, via communications network 714, for the regional variant data 106a.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 6-7 could be used to perform one or more of the actions in FIG. 10.

Figure 11:
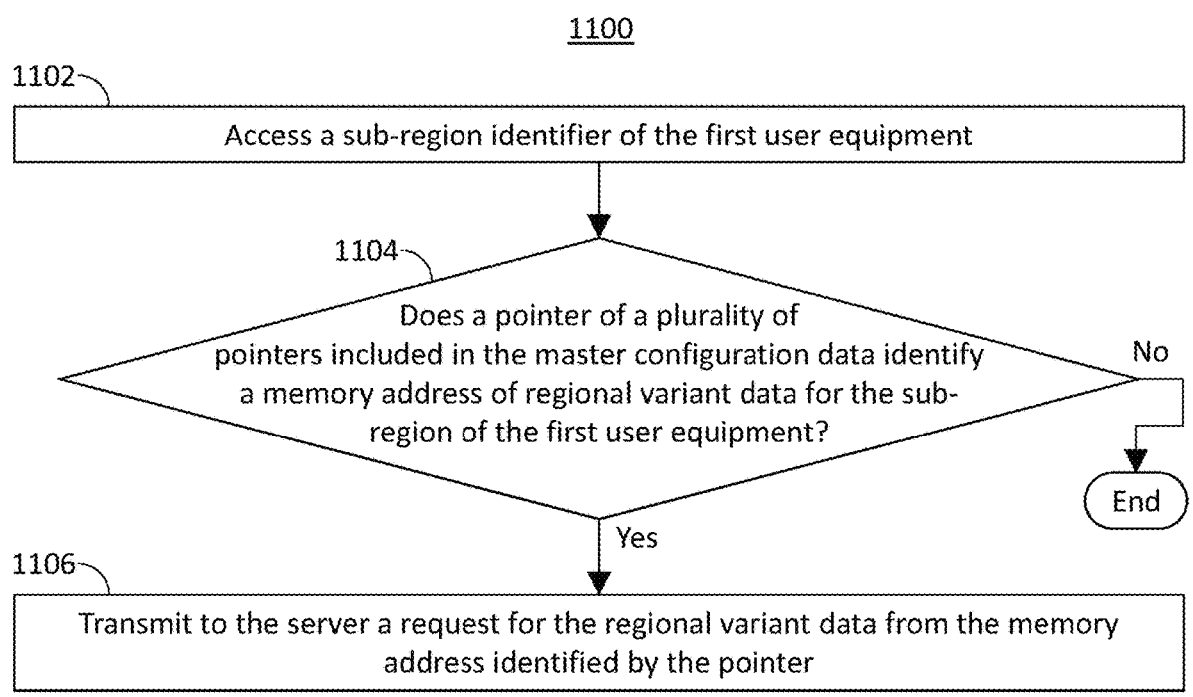
FIG. 11 is a flowchart representing a process for requesting regional variant data, in accordance with some embodiments of the disclosure.

FIG. 11 is a flowchart representing an illustrative process for requesting regional variant data in accordance with some embodiments of the disclosure. The flowchart in FIG. 11 represents a process 1100 implemented on control circuitry 604 for requesting regional variant data according to an embodiment of the disclosure. It should be noted that process 1100 or any action thereof could be performed on, or provided by, any of the devices shown in FIGS. 6-7. For example, process 1100 may be executed by control circuitry 604 (FIG. 6) as instructed by a media guidance application implemented on a user device (e.g., user equipment devices 702, 704, and/or 706 (FIG. 7), or user equipment 202a-n, 204a-n, and/or 206a-n (FIG. 2)) in order to request regional variant data. In addition, one or more actions of process 1100 may be incorporated into or combined with one or more actions of any other process or embodiment described herein.

At 1102, the first user equipment 202a may be configured to access a sub-region identifier of the first user equipment 202a. For example, the first user equipment 202a may contain a variable or other data structure identifying the sub-region 202 in which the first user equipment 202a is located.

At 1104, the first user equipment 202a may be configured to determine if a pointer of a plurality of pointers included in the master configuration data 102 identifies a memory address of regional variant data 106a for the sub-region 202 of the first user equipment 202a. For example, the master configuration data 102 may include a list, table, or database of available regional variant data, and specific locations from which each regional variant data may be retrieved by the first user equipment 202a. The location may include a resource locator, such as a URL, a memory location, or any other suitable type of address or locator.

At 1106, in response to determining that a pointer of the plurality of pointers included in the master configuration data 102 identifies a memory address of regional variant data 106a for the sub-region 202 of the first user equipment 202a, user equipment 202a may be configured to transmit to the server 200 a request 210, via communications network 714, for the regional variant data 106a from the memory address identified by the pointer.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 6-7 could be used to perform one or more of the actions in FIG. 11.

Figure 12:
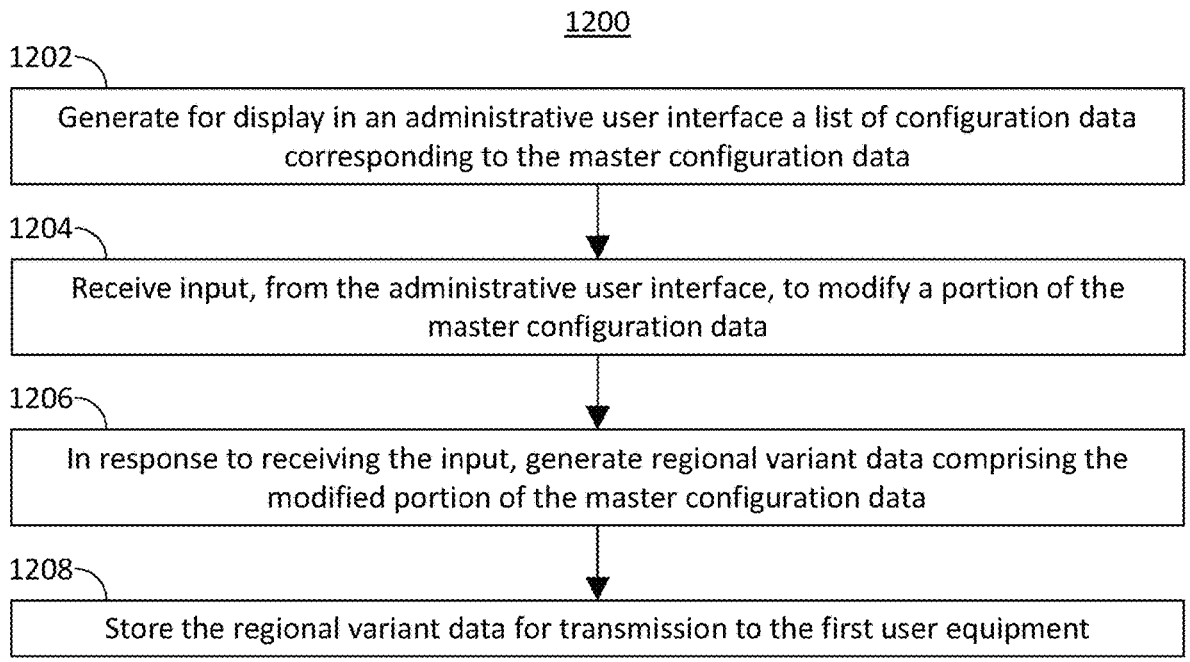
FIG. 12 is a flowchart representing a process for generating regional variant data using an administrative interface, in accordance with some embodiments of the disclosure.

FIG. 12 is a flowchart representing an illustrative process for generating regional variant data using an administrative interface in accordance with some embodiments of the disclosure. The flowchart in FIG. 12 represents a process 1200 implemented on control circuitry 604 for generating regional variant data using an administrative interface according to an embodiment of the disclosure. It should be noted that process 1200 or any action thereof could be performed on, or provided by, any of the devices shown in FIGS. 6-7. For example, process 1200 may be executed by control circuitry 604 (FIG. 6) as instructed by a media guidance application implemented on an administrative user device (e.g., device 600 (FIG. 6)) in order to generate regional variant data using an administrative interface. In addition, one or more actions of process 1200 may be incorporated into or combined with one or more actions of any other process or embodiment described herein.

At 1202, control circuitry 604 may be configured to generate for display in an administrative user interface 300 a list of configuration data corresponding to the master configuration data 102. For example, control circuitry 604 may access master configuration data 102 from a database, data file, or other data structure. Control circuitry 604 may query the database, data file, or data structure to extract the master configuration data. Alternatively, control circuitry 604 may parse the database, data file or data structure to extract the master configuration data. Once extracted, control circuitry 604 may generate a display, such as a table, to be populated by the master configuration data.

At 1204, control circuitry 604 may be configured to receive input, from the administrative user interface 300, to modify a portion of the master configuration data 102. For example, control circuitry 604 may receive input from user input interface 610. The input may specify a particular item of configuration data to be modified. For example, the input may include an identifier of the selected configuration data, such as a channel number. The input may also specify a particular sub-region for which regional variant data is to be configured. Control circuitry 604 may allow multiple regional variants to be configured simultaneously for a single item of configuration data, in which case the input may identify a plurality of sub-regions for which regional variant data is to be configured. Alternatively, each sub-region may have to be configured individually. The input may further include the regional variant data which differs from the master configuration data.

At 1206, in response to receiving the input, control circuitry 604 may be configured to generate regional variant data comprising the modified portion of the master configuration data 102. For example, the input may specify a new service ID for channel 101 in sub-region 202. Control circuitry 604 may determine if a regional variant data file for sub-region 202 exists. If not, control circuitry 604 may create a regional variant data file for sub-region 202 and populate the file with configuration data for channel 101 from the master configuration data, with the service ID included in the input replacing the corresponding service ID from the master configuration data. If the regional variant data file already exists, control circuitry 604 may append this data to the existing file.

At 1208, control circuitry 604 may be configured to store the regional variant data or transmission to the first user equipment. For example, control circuitry 604 may store the regional variant data file on the headend, data carousel, or server 100, where user equipment can access it.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 6-7 could be used to perform one or more of the actions in FIG. 12.

Figure 13:
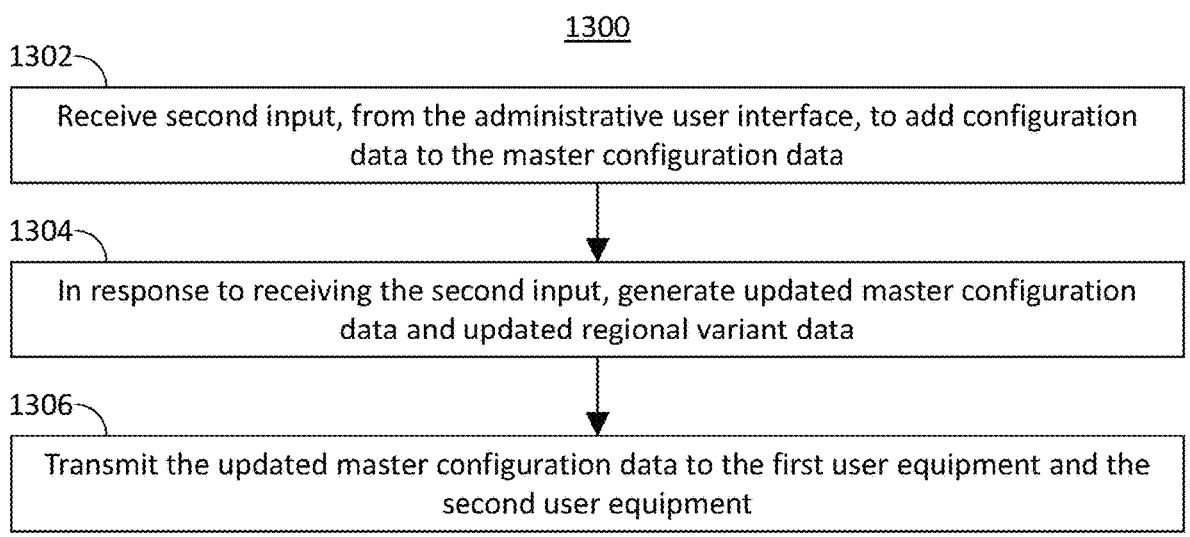
FIG. 13 is a flowchart representing a process for generating updated master configuration data and updated regional variant data. in accordance with some embodiments of the disclosure.

FIG. 13 is a flowchart representing an illustrative process for generating updated master configuration data and updated regional variant data in accordance with some embodiments of the disclosure. The flowchart in FIG. 13 represents a process 1300 implemented on control circuitry 604 for generating updated master configuration data and updated regional variant data according to an embodiment of the disclosure. It should be noted that process 1300 or any action thereof could be performed on, or provided by, any of the devices shown in FIGS. 6-7. For example, process 1300 may be executed by control circuitry 604 (FIG. 6) as instructed by a media guidance application implemented on an administrative user device (e.g., device 600 (FIG. 6)) in order to generate updated master configuration data and updated regional variant data. In addition, one or more actions of process 1300 may be incorporated into or combined with one or more actions of any other process or embodiment described herein.

At 1302, control circuitry 604 may be configured to receive second input from the administrative user interface 300 to add configuration data to the master configuration data 102. For example, the input may include configuration data for a new channel added to the available channels in the geographical region. The input may include all the configuration data necessary for the majority of sub-regions to access the new channel, and indications of regional variations for a particular sub-region or set of sub-regions.

At 1304, in response to receiving the second input, control circuitry 604 may be configured to generate updated master configuration data and updated regional variant data. For example, control circuitry 604 may append the configuration data from the input to the master configuration data 102. Control circuitry 604 may also append the regional variations to the corresponding regional variant data files. If any regional variant data file does not exist then, as described above, control circuitry 604 may create the required regional variant data file.

At 1306, control circuitry 604 may be configured to transmit the updated master configuration data to the first user equipment 202*a* and the second user equipment 204*a* via communications network 714.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 6-7 could be used to perform one or more of the actions in FIG. 13.

Figure 14:
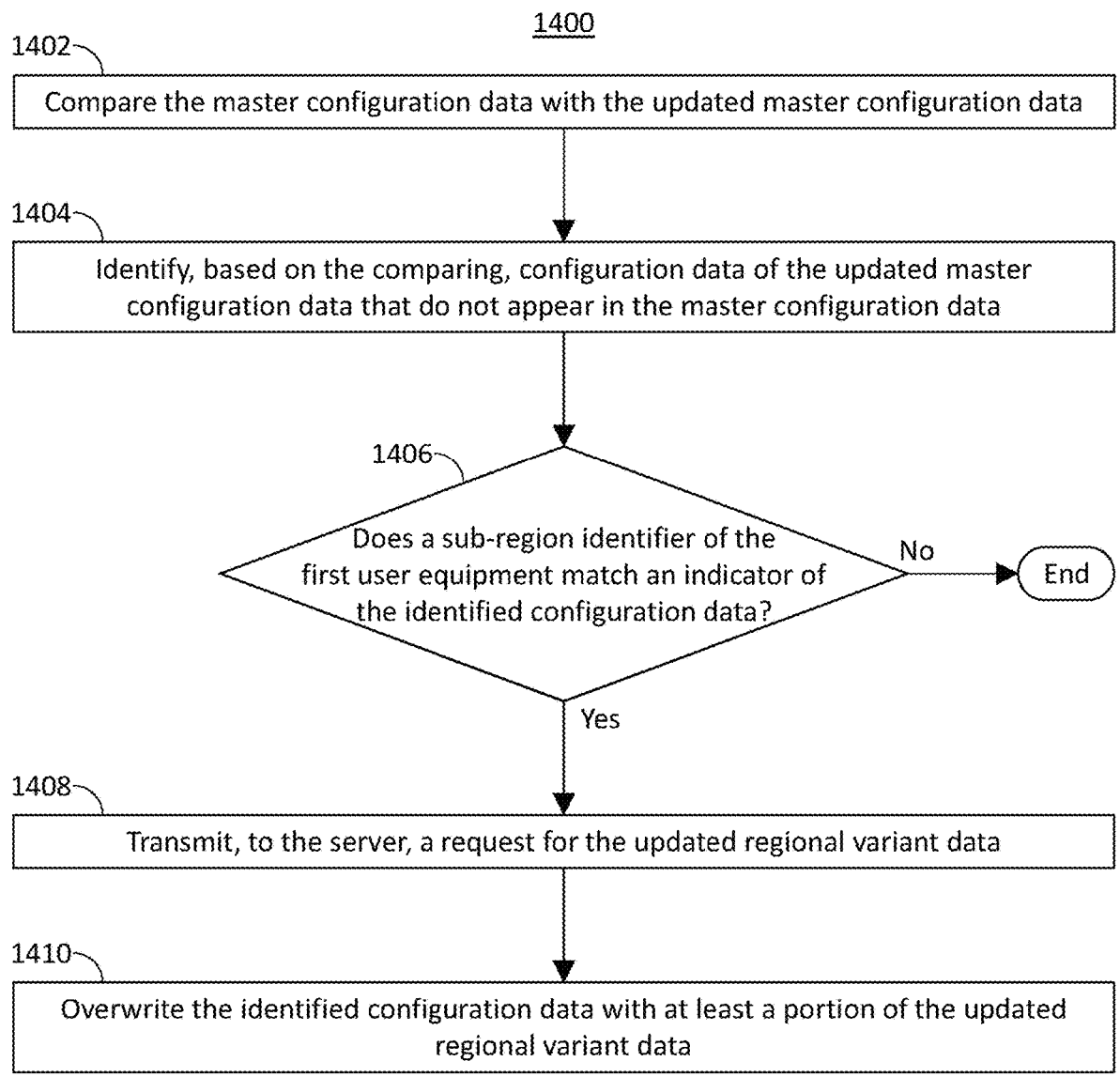
FIG. 14 is a flowchart representing a process for generating updated configuration data specific to a sub-region of a geographical region, in accordance with some embodiments of the disclosure.

FIG. 14 is a flowchart representing an illustrative process for generating updated configuration data specific to a sub-region of a geographical region in accordance with some embodiments of the disclosure. The flowchart in FIG. 14 represents a process 1400 implemented on control circuitry 604 for generating updated configuration data specific to a sub-region of a geographical region according to an embodiment of the disclosure. It should be noted that process 1400 or any action thereof could be performed on, or provided by, any of the devices shown in FIGS. 6-7. For example, process 1400 may be executed by control circuitry 604 (FIG. 6) as instructed by a media guidance application implemented on a user device (e.g., user equipment devices 702, 704, and/or 706 (FIG. 7), or user equipment 202*a*-*n*, 204*a*-*n*, and/or 206*a*-*n* (FIG. 2)) in order to generate updated configuration data specific to a sub-region of a geographical region. In addition, one or more actions of process 1400 may be incorporated into or combined with one or more actions of any other process or embodiment described herein.

At 1402, in response to receiving, via communications network 714, the updated master configuration data, first user equipment 202*a* may be configured to compare the master configuration data 102 with the updated master configuration data. For example, control circuitry 604 may perform a comparison of the content of the updated master configuration data with the previously-received master configuration data 102. Control circuitry 604 may perform the comparison by ordering the master configuration data 102 and the updated master configuration data in the same manner, such as by channel number in ascending order. Control circuitry 604 may step through each entry in both the master configuration data 102 and the update master configuration data and compare the data in the two corresponding entries. Any discrepancy may be logged or otherwise recorded in a log file, database, or other data structure.

At 1404, the first user equipment 202*a* may be configured to identify, based on the comparing, configuration data of the updated master configuration data that do not appear in the master configuration data 102. For example, control circuitry 604 may log an entry in the updated master configuration data having every item of information in the entry different from the corresponding entry in the master configuration data 102, and with every subsequent entry have a channel number that differs from entries in the master configuration data 102 having otherwise identical information. From this, control circuitry 604 may determine that a new channel has been added in the updated master configuration data, and that subsequent channels in the lineup have been renumbered.

At 1406, first user equipment 202 may be configured to determine if a sub-region identifier of the first user equipment 202*a* matches an indicator of the identified configuration data. For example, control circuitry 604 may access a flag or indicator of the added configuration data of the updated master configuration data. As described above, control circuitry 604 may determine if the flag or indicator includes a sub-region identifier corresponding to the sub-region 202 in which the first user equipment 202*a* is located.

At 1408, in response to determining that the sub-region identifier of the first user equipment 202*a* matches an indicator of the identified configuration data, the first user equipment 202*a* may be configured to transmit, to the server 100, a request for the updated regional variant data. This may be accomplished using methods already described above.

At 1410, first user equipment 202*a* may be configured to overwrite the identified configuration data with at least a portion of the updated regional variant data. This may be accomplished using methods already described above.

It is contemplated that the actions or descriptions of FIG. 14 may be used with any other embodiment of this disclosure. In addition, the actions and descriptions described in relation to FIG. 14 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 6-7 could be used to perform one or more of the actions in FIG. 14.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating user equipment configuration data, the method comprising:

transmitting, from a server, master configuration data to first user equipment and second user equipment of the geographical region;

receiving, from the first user equipment, a first request for first variant data specific to the first user equipment;

receiving, from the second user equipment, a second request for second variant data specific to the second user equipment;

in response to receiving the first request:
determining whether the first variant data is available;
determining, based on first user profile information, whether the first variant data is accessible by the first user equipment; and
in response to determining that the first variant data is available and accessible by the first user equipment, transmitting the first variant data to the first user equipment, wherein the first user equipment generates first configuration data by modifying a first portion of the master configuration data based on the first variant data; and in response to receiving the second request:
determining whether the second variant data is available;
determining, based on second user profile information, whether the second variant data is accessible by the second user equipment; and
in response to determining that the second variant data is available and accessible by the second user equipment, transmitting the second variant data to the second user equipment, wherein the second user equipment generates second configuration data by modifying a second portion of the master configuration data different from the first portion based on the second variant data.

2. The method of claim 1, wherein the master configuration data is a media source lineup, and wherein the first user equipment generates the first configuration data by:
determining the first portion of the media source lineup corresponding to the first variant data; and
overwriting the first portion of the media source lineup with the first variant data.

3. The method of claim 1, wherein the master configuration data is a media source lineup, and wherein the first user equipment generates the first configuration data by:
determining a portion of the first variant data that does not correspond to any portion of the master configuration data; and
adding the portion of the first variant data to the media source lineup.

4. The method of claim 1, wherein the master configuration data includes an indicator that at least a portion of the master configuration data should be overwritten with the first variant data.

5. The method of claim 4, wherein the first user equipment requests the first variant data in response to detecting the indicator.

6. The method of claim 4, wherein the indicator further identifies a particular subscription, and wherein the first user equipment requests the first variant data by:
identifying a portion of the master configuration data that should be overwritten with variant data;
determining whether the identified portion of the master configuration data should be overwritten with variant data for a subscription identified by a subscription identifier of the first user equipment; and
in response to determining that at the identified portion of the master configuration data should be overwritten with variant data for the subscription identified by the subscription identifier of the first user equipment, transmitting to the server the first request.

7. The method of claim 1 wherein at least one of the first user profile information and the second user profile information comprises a prediction of a future action.

8. The method of claim 1 wherein at least one of the first user profile information and the second user profile information comprises a score generated by a model.

9. The method of claim 1 wherein at least one of the first user profile information and the second user profile information comprises user activity information.

10. A system for generating user equipment configuration data, the system comprising:
a server; and
control circuitry configured to:
transmit, from the server, master configuration data to first user equipment and second user equipment of the geographical region;
receive, from the first user equipment, a first request for first variant data specific to the first user equipment;
receive, from the second user equipment, a second request for second variant data specific to the second user equipment;
in response to receiving the first request:
determine whether the first variant data is available;
determine, based on first user profile information, whether the first variant data is accessible by the first user equipment and
in response to determining that the first variant data is available and accessible by the first user equipment, transmit the first variant data to the first user equipment, wherein the first user equipment generates first configuration data specific to the first sub-region by modifying a first portion of the master configuration data based on the first variant data; and
in response to receiving the second request:
determine whether the second variant data is available;
determine, based on second user profile information, whether the second variant data is accessible by the second user equipment; and
in response to determining that the second variant data is available and accessible by the second user equipment, transmit the second variant data to the second user equipment, wherein the second user equipment generates second configuration data specific to the second sub-region by modifying a second portion of the master configuration data different from the first portion based on the second variant data.

11. The system of claim 10, wherein the master configuration data is a media source lineup, and wherein the first user equipment generates the first configuration data using second control circuitry configured to:
determine the first portion of the media source lineup corresponding to the first variant data; and
overwrite the first portion of the media source lineup with the first variant data.

12. The system of claim 10, wherein the master configuration data is a media source lineup, and wherein the first user equipment generates the first configuration data using second control circuitry configured to:
determine a portion of the first variant data that does not correspond to any portion of the master configuration data; and
add the portion of the first variant data to the media source lineup.

13. The system of claim 10, wherein the master configuration data includes an indicator that at least a portion of the master configuration data should be overwritten with the first variant data.

14. The system of claim 13, wherein the first user equipment requests the first variant data in response to detecting the indicator.

15. The system of claim 13, wherein the indicator further identifies a particular subscription, and wherein the first user equipment requests the first variant data using second control circuitry configured to:
identify a portion of the master configuration data that should be overwritten with variant data;

determine whether the identified portion of the master configuration data should be overwritten with variant data for a subscription identified by a subscription identifier of the first user equipment; and in response to determining that at the identified portion of the master configuration data should be overwritten with variant data for the subscription identified by the subscription identifier of the first user equipment, transmit to the server the first request.

16. The system of claim 10 wherein at least one of the first user profile information and the second user profile information comprises a prediction of a future action.

17. The system of claim 10 wherein at least one of the first user profile information and the second user profile information comprises a score generated by a model.

18. The system of claim 10 wherein at least one of the first user profile information and the second user profile information comprises user activity information.

\* \* \* \* \*